(12) United States Patent
Kolhatkar et al.

(10) Patent No.: US 9,705,360 B2
(45) Date of Patent: Jul. 11, 2017

(54) REDUNDANT UNINTERRUPTIBLE POWER SUPPLY SYSTEMS

(71) Applicant: General Electric Company, Schenectady, NY (US)

(72) Inventors: Yashomani Kolhatkar, Bangalore (IN); Rajendra Naik, Bangalore (IN); Viswanathan Kanakasabai, Bangalore (IN); Silvio Colombi, Losone (CH)

(73) Assignee: General Electric Company, Schenectady, NY (US)

(*) Notice: Subject to any disclaimer, the term of this patent is extended or adjusted under 35 U.S.C. 154(b) by 551 days.

(21) Appl. No.: 14/306,791

(22) Filed: Jun. 17, 2014

(65) Prior Publication Data

US 2015/0263567 A1   Sep. 17, 2015

Related U.S. Application Data

(60) Provisional application No. 61/951,286, filed on Mar. 11, 2014.

(51) Int. Cl.
*H02J 9/06* (2006.01)
*H02J 3/24* (2006.01)
(Continued)

(52) U.S. Cl.
CPC ............ *H02J 9/061* (2013.01); *G05F 3/02* (2013.01); *H02J 3/24* (2013.01); *H02J 3/38* (2013.01);
(Continued)

(58) Field of Classification Search
CPC .... H02J 9/06; H02J 9/061; H02J 9/062; H02J 3/46; H02J 3/40; H02J 3/42; Y10T 307/62; Y10T 307/615; Y10T 307/344
See application file for complete search history.

(56) References Cited

U.S. PATENT DOCUMENTS 5,473,528 A     12/1995   Hirata et al.
5,745,356 A  *   4/1998   Tassitino, Jr. ............. H02J 3/46
                                                          307/32
(Continued)

FOREIGN PATENT DOCUMENTS

CN     202333831 U     7/2012
CN     202444318 U     9/2012
(Continued)

OTHER PUBLICATIONS

Chandorkar et al. "Control of parallel connected inverters in stand-alone AC supply systems." IEEE Transactions on Industry Applications 29.1 (1993): 136-143.*

(Continued)

*Primary Examiner* — Ryan Johnson
(74) *Attorney, Agent, or Firm* — General Electric Company

(57) ABSTRACT

A system is provided. The system includes a plurality of uninterruptible power supplies (UPSs), a ring bus, at least one load electrically coupled to the plurality of UPSs and the ring bus, and a controller communicatively coupled to the plurality of UPSs. The controller is configured to calculate an output voltage frequency for each UPS of the plurality of UPSs, and control operation of each UPS based on the respective calculated output voltage frequencies.

18 Claims, 6 Drawing Sheets

(51) Int. Cl.
*H02J 3/38* (2006.01)
*H02J 3/40* (2006.01)
*G05F 3/02* (2006.01)
*H02J 4/00* (2006.01)

(52) U.S. Cl.
CPC ........ *H02J 3/40* (2013.01); *H02J 4/00* (2013.01); *H02J 9/062* (2013.01); *Y10T 307/344* (2015.04)

(56) References Cited

U.S. PATENT DOCUMENTS

| | | | |
|---|---|---|---|
| 6,121,695 | A | 9/2000 | Loh |
| 6,191,500 | B1 | 2/2001 | Toy |
| 6,803,679 | B1 | 10/2004 | Luo et al. |
| 7,400,066 | B2 | 7/2008 | Tassitino, Jr. et al. |
| 7,405,494 | B2 | 7/2008 | Tassitino, Jr. et al. |
| 7,425,779 | B2 | 9/2008 | Luo et al. |
| 7,446,433 | B2 | 11/2008 | Masciarelli et al. |
| 7,456,520 | B2 | 11/2008 | Colombi et al. |
| 7,459,803 | B2 | 12/2008 | Mosman |
| 7,566,988 | B2 | 7/2009 | Heber et al. |
| 7,615,890 | B2 | 11/2009 | Masciarelli et al. |
| 7,638,899 | B2 | 12/2009 | Tracy et al. |
| 7,649,758 | B2 | 1/2010 | Taimela et al. |
| 7,667,351 | B2 | 2/2010 | Marwali et al. |
| 7,701,087 | B2 | 4/2010 | Eckroad et al. |
| 7,825,541 | B2 | 11/2010 | Herbener et al. |
| 7,980,905 | B2 | 7/2011 | Rembach et al. |
| 8,022,572 | B2 | 9/2011 | Vyas et al. |
| 8,035,250 | B2 | 10/2011 | Caudill |
| 8,062,081 | B2 | 11/2011 | Barrett et al. |
| 8,148,846 | B2 | 4/2012 | Masciarelli et al. |
| 8,552,589 | B2 | 10/2013 | Ghosh et al. |
| 8,604,640 | B2 | 12/2013 | Masciarelli et al. |
| 8,786,262 | B2 | 7/2014 | Rajashekara et al. |
| 2004/0084965 | A1 | 5/2004 | Welches et al. |
| 2005/0052085 | A1 | 3/2005 | Chang et al. |
| 2006/0006741 | A1 | 1/2006 | Tassitino, Jr. et al. |
| 2006/0113800 | A1 | 6/2006 | Willisch et al. |
| 2006/0167569 | A1 | 7/2006 | Colombi et al. |
| 2007/0007825 | A1 | 1/2007 | Heber et al. |
| 2007/0063677 | A1 | 3/2007 | Schauder |
| 2009/0009001 | A1 | 1/2009 | Marwali et al. |
| 2009/0009005 | A1 | 1/2009 | Luo et al. |
| 2009/0273192 | A1 | 11/2009 | Guven et al. |
| 2010/0002475 | A1 | 1/2010 | Folts et al. |
| 2010/0096853 | A1 | 4/2010 | Woldmann et al. |
| 2011/0106325 | A1 | 5/2011 | Opina, Jr. et al. |
| 2011/0278932 | A1 | 11/2011 | Navarro et al. |
| 2011/0278934 | A1 | 11/2011 | Ghosh et al. |
| 2011/0309677 | A1 | 12/2011 | Bourgeau |
| 2012/0068541 | A1 | 3/2012 | Anderson |
| 2013/0002014 | A1 | 1/2013 | Moore et al. |
| 2013/0069432 | A1 | 3/2013 | Beg et al. |
| 2013/0069434 | A1 | 3/2013 | Beg et al. |
| 2013/0193760 | A1 | 8/2013 | Colombi et al. |
| 2014/0139016 | A1 | 5/2014 | Lovercheck et al. |

FOREIGN PATENT DOCUMENTS

| | | |
|---|---|---|
| CN | 202889279 U | 4/2013 |
| CN | 103560576 A | 2/2014 |
| DE | 102008024222 A1 | 2/2009 |
| DE | 10 2009 017 244 A1 | 10/2010 |
| EP | 1 006 641 A2 | 6/2000 |
| EP | 1 919 055 A2 | 5/2008 |
| EP | 2 101 392 A2 | 9/2009 |
| EP | 2 587 609 A1 | 5/2013 |
| EP | 2608355 A2 | 6/2013 |
| EP | 2911035 A1 | 8/2015 |
| JP | 2005033890 A | 2/2005 |
| KR | 10-1267513 B1 | 5/2013 |
| WO | 2004/025823 A1 | 3/2004 |
| WO | 2013/123546 A1 | 8/2013 |
| WO | 2013/142561 A1 | 9/2013 |

OTHER PUBLICATIONS

Guerrero, Josep M., et al. "Control of line-interactive UPS connected in parallel forming a microgrid." 2007 IEEE International Symposium on Industrial Electronics. IEEE, 2007.*
TMS320LC2402a datasheet. 2005. Retrieved from http://www.ti.com/lit/ds/symlink/tms32lc2402a.pdf.*
TMS320C6711b datasheet. 2005. Retrieved from http://www.ti.com/lit/ds/symlink/tms320c6711b.pdf.*
Noworolski, "Parallel UPS Control and Configuration", Third International Telecommunications Energy Conference, pp. 205-209, May 19-21, 1981.
Xing et al., "Novel control for redundant parallel UPSs with instantaneous current sharing", Proceedings of the Power Conversion Conference, vol. 3, pp. 959-963, 2002.
Guerrero et al., "A high-performance DSP-controller for parallel operation of online UPS systems", Nineteenth Annual IEEE Applied Power Electronics Conference and Exposition, vol. 1, pp. 463-469, 2004.
Sato et al., "High Reliability and High Performance Parallel-Connected UPS System with Independent Control", Twenty-Seventh International Telecommunications Conference, pp. 389-394, Sep. 2005.
European Search Report and Written Opinion issued in connection with EP Application No. 15155175.1 dated Jun. 23, 2015.
Mosman, "An Isolated-Parallel UPS System for a Large Data Center", The Magazine of 7×24 Exchange International, Data Center Cooling Energy Basics, 2007, pp. 6-8.
Johnson et al., "An Industrial Power Distribution System Featuring UPS Properties", Power Electronics Specialists Conference, 1993. PESC '93 Record., 24th Annual IEEE, Jun. 1993, pp. 759-765.
Zhongyi et al., "Distributed Control for UPS Modules in Parallel Operation With RMS Voltage Regulation", Industrial Electronics, IEEE Transactions On , Aug. 2008, pp. 2860-2869, (vol. 55 , Issue: 8 ).
Holtz, Joachim, and K-H. Werner. "Multi-inverter UPS system with redundant load sharing control." IEEE Transactions on Industrial Electronics 37.6 (1990): 506-513.
Shanxu, Duan, et al. "Parallel operation control technique of voltage source inverters in UPS." Power Electronics and Drive Systems, 1999. PEDS'99. Proceedings of the IEEE 1999 International Conference on. vol. 2. IEEE, 1999.
TMS320F240 DSP Controller (Rev. E) Datasheet, Nov 2002, Retrieved from http://www.ti.com/product/TMS320F240.
U.S. Appl. No. 14/306,641, filed Jun. 17, 2014, Kolhatkar et al.
U.S. Appl. No. 14/186,159, filed Feb. 21, 2014, Kolhatkar et al.
U.S. Appl. No. 14/725,949, filed May 29, 2015, Tiwari et al.
U.S. Appl. No. 14/732,215, filed Jun. 5, 2015, Tiwari et al.
Byun Y.B., et al., "Parallel Operation of Three-Phase UPS Inverters by Wireless Load Sharing Control", Twenty-second International Telecommunications Energy Conference, Sep. 10-14, 2000, IEEE, pp. 526-532.
Iwanski G. and Koczara W., "DFIG-Based Power Generation System With UPS Function for Variable-Speed Applications," IEEE Transactions on Industrial Electronics, vol. 55, Issue 8, Aug. 8, 2008, pp. 3047-3054.
Liu X. et al., "A Hybrid AC/DC Microgrid and Its Coordination Control," IEEE Transactions on Smart Grid, vol. 2, Issue 2, Jun. 2011, pp. 278-286.
Waris T. and Nayar C.V., "Variable speed constant frequency diesel power conversion system using doubly fed induction generator (DFIG)," Power Electronics Specialists Conference, 2008, PESC'2008, IEEE, Jun. 15-19, 2008, pp. 2728-2734.
Yao et al.,"Development of Communicationless Hot-Swap Paralleling for Single-Phase UPS Inverters Based on Adaptive Droop Method," Applied Power Electronics Conference and Exposition, Feb. 15, 2009, pp. 1283-1287.

(56) References Cited

OTHER PUBLICATIONS

Zhou Y., et al., "Grid-connected and islanded operation of a hybrid power system," Power Engineering Society Conference and Exposition in Africa, 2007, PowerAfrica '07, IEEE, Jul. 16-20, 2007, pp. 1-6.

Extended European Search Report and Opinion issued in connection with corresponding EP Application No. 15157301.1 on Aug. 14, 2015.

Extended European Search Report and Opinion issued in connection with related EP Application No. 15157305.2 on Sep. 28, 2015.

Extended European Search Report and Opinion issued in connection with related EP Application No. 16170543.9 on Oct. 24, 2016.

Extended European Search Report and Opinion issued in connection with related EP Application No. 16172123.8 on Nov. 4, 2016.

\* cited by examiner

REDUNDANT UNINTERRUPTIBLE POWER SUPPLY SYSTEMS

CROSS REFERENCE TO RELATED APPLICATIONS

This application is a non-provisional application and claims priority to U.S. Provisional Patent Application Ser. No. 61/951,286 filed Mar. 11, 2014 for "REDUNDANT UNINTERRUPTIBLE POWER SUPPLY SYSTEMS", which is hereby incorporated by reference in its entirety.

BACKGROUND

The field of the invention relates generally to uninterruptible power supplies, and more particularly, to implementing uninterruptible power supplies in a ring bus architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

In at least some known power systems, different power sources, such as separate UPSs, may interfere with one another. If the power sources are not synchronized with one another, they may begin to override one another, causing oscillations or other undesirable effects, and impacting power delivered to one or more loads. Further, sudden disconnection of a load from a UPS may generate undesirable transients in a power system.

BRIEF DESCRIPTION

In one aspect, a system is provided. The system includes a plurality of uninterruptible power supplies (UPSs), a ring bus, at least one load electrically coupled to the plurality of UPSs and the ring bus, and a controller communicatively coupled to the plurality of UPSs. The controller is configured to calculate an output voltage frequency for each UPS of the plurality of UPSs, and control operation of each UPS based on the respective calculated output voltage frequencies.

In another aspect, a controller for controlling a power supply system that includes a plurality of uninterruptible power supplies (UPSs), a ring bus, and at least one load electrically coupled to the plurality of UPSs and the ring bus is provided. The controller includes a processor, and a memory device communicatively coupled to the processor, the memory device storing executable instructions configured to cause the processor to calculate an output voltage frequency for each UPS of the plurality of UPSs, and control operation of each UPS based on the respective calculated output voltage frequencies.

In yet another aspect, a method of controlling a power supply system is provided. The power supply system includes a plurality of uninterruptible power supplies (UPSs), a ring bus, and at least one load electrically coupled to the plurality of UPSs and the ring bus. The method includes calculating, using a controller communicatively coupled to the plurality of UPSs, an output voltage frequency for each UPS of the plurality of UPSs, and controlling operation of each UPS based on the respective calculated output voltage frequencies.

DETAILED DESCRIPTION

Exemplary embodiments of an uninterruptible power supply system are described here. The plurality of uninterruptible power supplies are arranged in a ring bus configuration and configured to supply power to at least one load. A control device is communicatively coupled to the plurality of uninterruptible power supplies. The control device calculates an output voltage frequency for each of the plurality of uninterruptible power supplies, and controls the uninterruptible power supplies such that each uninterruptible power supply operates at its respective calculated frequency to supply power to the at least one load.

Figure 1:
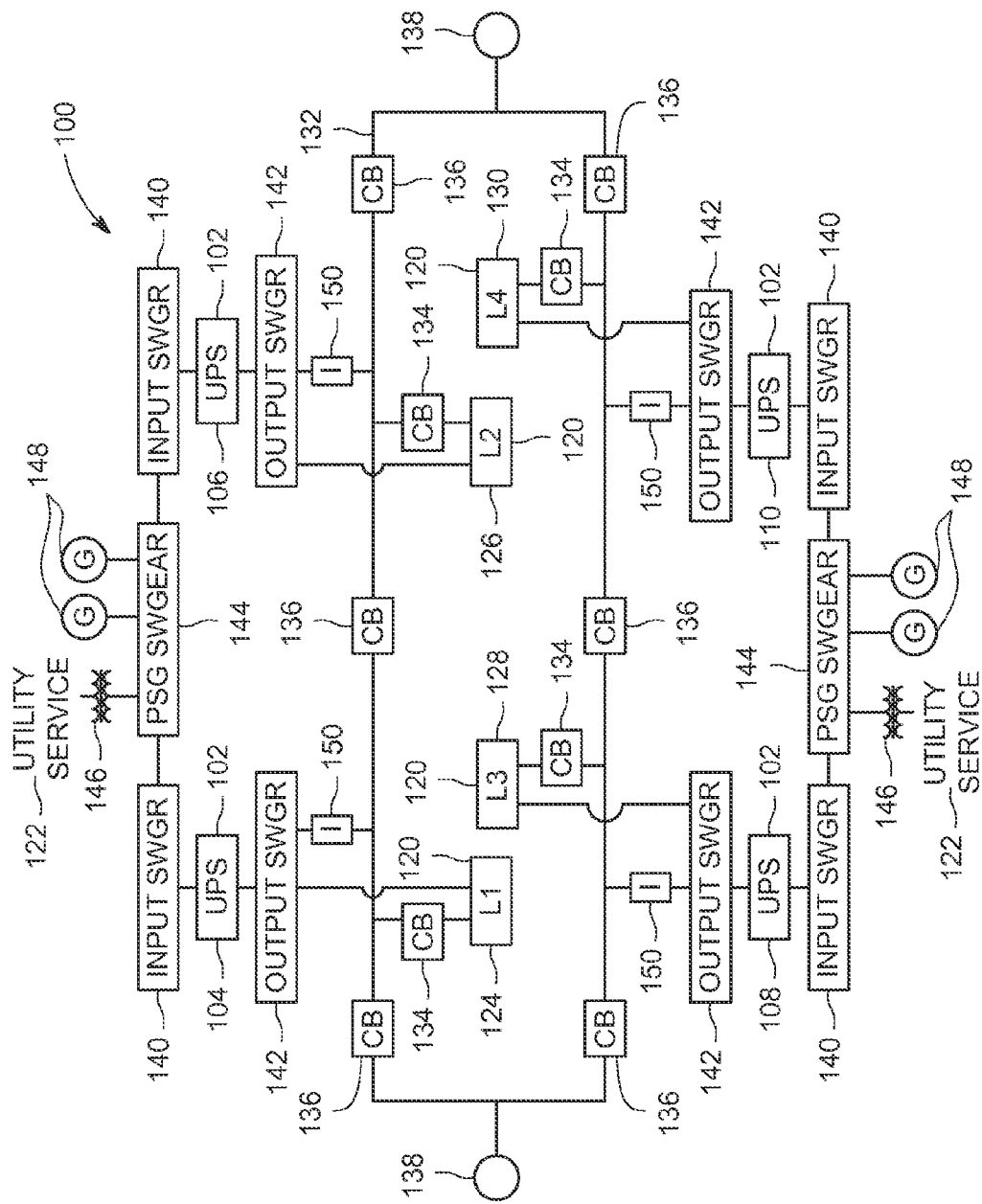
FIG. 1 is a schematic diagram of an exemplary power supply system.

FIG. 1 is a schematic diagram of an exemplary redundant isolated-parallel (IP) uninterruptible power supply (UPS) system 100. In the exemplary embodiment, system 100 includes a plurality of UPSs 102 arranged in a ring architecture, or parallel architecture, as described herein. Specifically, system 100 includes a first UPS 104, a second UPS 106, a third UPS 108, and a fourth UPS 110 in the exemplary embodiment. Alternatively, system 100 may include any number of UPSs 102 that enable system 100 to function as described herein. In the exemplary embodiment, system 100 is a three wire system. Alternatively, system 100 may be a four wire system (i.e., a system including a neutral wire to each load).

In the exemplary embodiment, UPSs 102 are static double conversion UPSs (i.e., true on-line system systems). Both static and rotary UPSs may require droop control techniques for both voltage and frequency. In some cases, droop control for frequency alone may be sufficient. In some embodiments, droop control techniques are adapted depending on whether a load is linear or non-linear.

System 100 facilitates providing power to one or more loads 120. Under normal operation, one or more utilities 122 function as a power source and provide power to loads 120. Utilities 122 may provide alternating current (AC) or direct current (DC) power to system 100. In the event that power from utilities 122 fails to reach loads 120 (e.g., due to a failure of utility 122 and/or devices between utility 122 and loads 120), system 100 utilizes UPSs 102 to keep power flowing to loads 120, as described herein. In the exemplary embodiment, system 100 includes a first load 124, a second load 126, a third load 128, and a fourth load 130. Alternatively, system 100 may include any number of loads 120 that enable system 100 to function as described herein.

Each load 120 is electrically coupled between an associated UPS 102 and a ring bus 132. Specifically, in the exemplary embodiment, each load 120 is coupled to ring bus 132 via an associated load circuit breaker 134. Further, ring bus 132 includes a plurality of ring bus circuit breakers 136. In the event that any segment of ring bus 132 fails or is shut down, the architecture of system 100 ensures that power is still able to reach loads 120. Notably, the architecture shown in FIG. 1 is merely exemplary. For example, in some embodiments, loads 120 may be coupled directly to ring bus 132 or may be coupled between UPSs 102. Further, system 100 may include additional UPSs 138 coupled directly to ring bus 132.

In the exemplary embodiment, each UPS 102 is electrically coupled between an input switchgear 140 and an output switchgear 142. Input switchgears 140 are electrically coupled to paralleling switchgears 144, which are in turn electrically coupled to utility 122 through an associated transformer 146. In the exemplary embodiment, each paralleling switchgear 144 is also electrically coupled to one or more grounds 148. Switchgears 140, 142, and 144 include may include local circuits, remote synchronization circuits, and/or software to facilitate attenuating disturbances, interference, and/or crosstalk on ring bus 132 to provide clean power to loads 120. In the exemplary embodiment, each output switchgear 142 is electrically coupled directly to an associated load 120, and coupled to ring bus 132 through an associated choke 150 (e.g., an inductor).

In system 100, without proper synchronization, UPSs 102 may interfere with one another and/or start to override one another, causing oscillations or other undesirable effects. Accordingly, in the exemplary embodiment, a controller (not shown in FIG. 1) controls operation UPSs 102. More specifically, the controller controls a frequency of an output voltage of each UPS 102, as described herein. The frequency for each UPS 102 is calculated as a function of power, as described herein.

Figure 2:
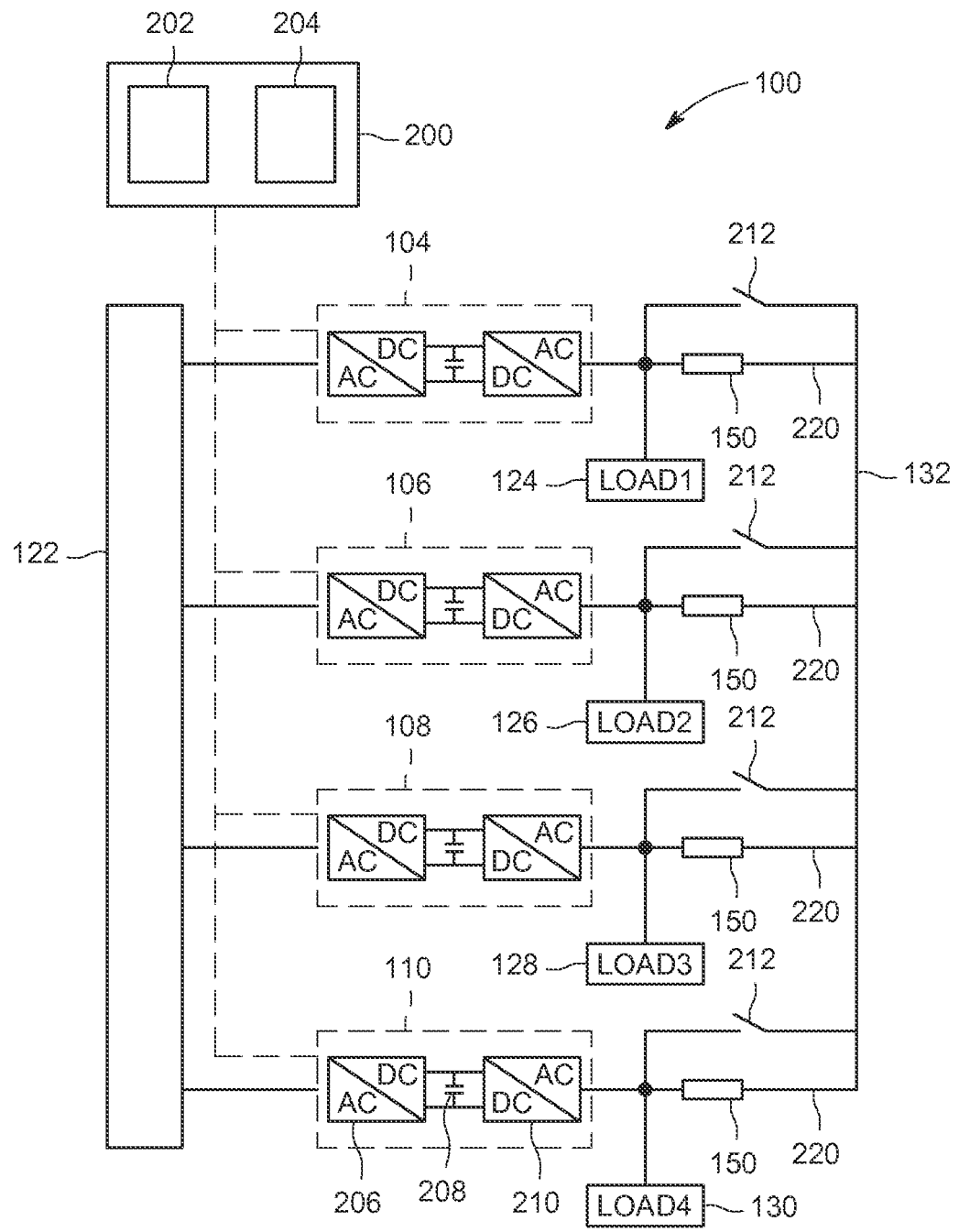
FIG. 2 is a simplified diagram of the system shown in FIG. 1.

FIG. 2 is a simplified diagram of system 100. As shown in FIG. 2, a controller 200 is communicatively coupled to each of first UPS 104, second UPS 106, third UPS 108, and fourth UPS 110. Although a single controller 200 is shown in FIG. 2, alternatively, a separate controller may control the operation of each UPS 102. Controller 200 may include its own power system (not shown) such as a dedicated energy source (e.g., a battery). In some embodiments, controller 200 is coupled to a substitute controller (not shown) that may be used in the event that controller 200 fails. Controller 200 may control power distribution and management of system 100 over a relatively large geographic area.

In the exemplary embodiment, controller 200 is implemented by a processor 202 communicatively coupled to a memory device 204 for executing instructions. In some embodiments, executable instructions are stored in memory device 204. Alternatively, controller 200 may be implemented using any circuitry that enables controller 200 to control operation of UPSs 102 as described herein. For example, in some embodiments, controller 200 may include a state machine that learns or is pre-programmed to determine information relevant to which loads 120 require power. For example, controller 200 may dynamically determine what power resources will be needed and at what performance level and environmental conditions (e.g., temperature, humidity, time of day, etc.) those power resources will need to operate. Controller 200 may perform dynamic monitoring to determine whether a given load 120 is satisfied with the power delivered, and whether delivered power is free of harmonics, transients, etc. In some embodiments, dynamic monitoring may include tracking resource usage to determine how much current or voltage should be delivered. Controller 200 may also monitor and/or control rapidity (i.e., bandwidth) and inverter capability (e.g., overload, reactive power, active power) to facilitate ensuring reliability of system 100 and minimizing performance degradation of UPSs 102.

Controller 200 may also include a state machine scheduler configured to selectively activate and deactivate power resources, set voltage and current levels, and/or take power saving actions (e.g., reducing current delivery). Controller 200 may also track characteristics (e.g., static allocation of power) of system 100 to determine whether one or more components of system 100 should be put on standby or whether power should be diverted.

In the exemplary embodiment, controller 200 performs one or more operations described herein by programming processor 202. For example, processor 202 may be programmed by encoding an operation as one or more executable instructions and by providing the executable instructions in memory device 204. Processor 202 may include one or more processing units (e.g., in a multi-core configuration). Further, processor 202 may be implemented using one or more heterogeneous processor systems in which a main processor is present with secondary processors on a single chip. As another illustrative example, processor 202 may be a symmetric multi-processor system containing multiple processors of the same type. Further, processor 202 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 202 causes controller 200 to operate UPSs 102, as described herein.

In the exemplary embodiment, memory device 204 is one or more devices that enable information such as executable instructions and/or other data to be stored and retrieved. Memory device 204 may include one or more computer readable media, such as, without limitation, dynamic random access memory (DRAM), static random access memory (SRAM), a solid state disk, and/or a hard disk. Memory device 204 may be configured to store, without limitation, application source code, application object code, source code portions of interest, object code portions of interest, configuration data, execution events and/or any other type of data.

As shown in FIG. 2, UPSs 102 and loads 120 are electrically coupled to one another through chokes 150 and ring bus 132. Further, in the exemplary embodiment, a switch (shown in a closed state in FIG. 2) is coupled between each choke 150 and ring bus 132. Each UPS 102 includes a rectifier 206, a DC capacitor 208, and an inverter 210 in the exemplary embodiment. Further, each load 120 is electrically coupled in parallel with an output capacitor (not shown), and each UPS 102 is electrically coupled in series with an inductor (not shown), in the exemplary embodiment. Each inductor and an associated output capacitor form an LC filter, and the phase angle δ is a phase angle of the output voltage of a UPS 102 as measured across the output capacitor. Further, a bypass switch 212 is coupled in parallel with each choke 150. Closing bypass switch 212 causes power flow to bypass an associated choke 150.

Loads 120 can receive power from a local UPS 102 (e.g., first load 124 receiving power from first UPS 104) and from other UPSs 102 through choke 150. Accordingly, in the event that a local UPS 102 fails, a load 120 can receive power from other UPSs 102.

In the exemplary embodiment, as described in more detail below, controller 200, and more specifically processor 202, calculates an output voltage frequency for each UPS 102, and controller 200 operates each UPS 102 at the calculated frequency. Operating each UPS 102 at their respective calculated frequencies facilitates load sharing and stability in system 100.

Figure 3:
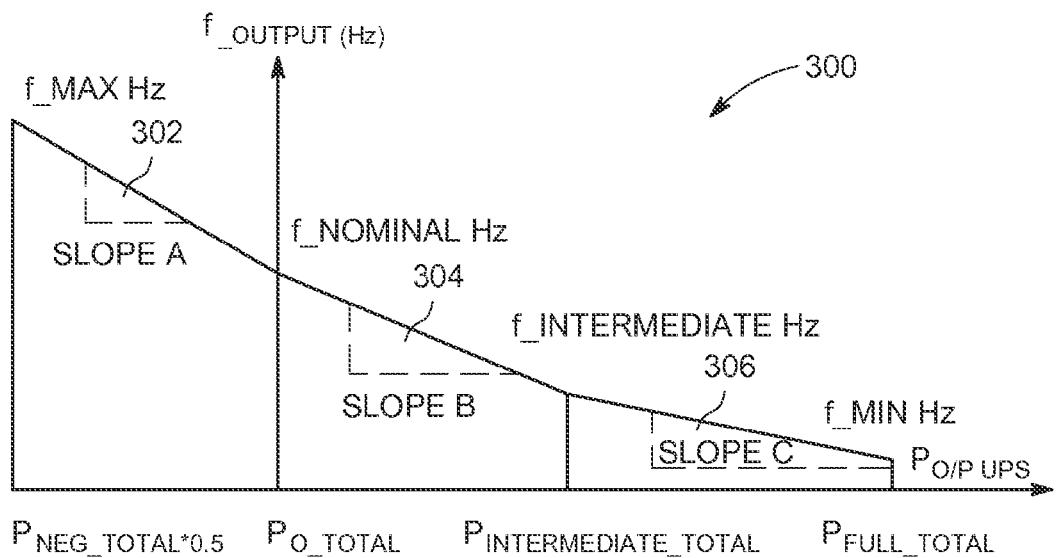
FIG. 3 is a diagram of an exemplary droop characteristic law that may be used to control the system shown in FIG. 1.

FIG. 3 is a diagram 300 of an exemplary droop characteristic law that may be used to calculate a frequency for UPSs 102 in system 100. As shown in FIG. 3, in the exemplary embodiment, the calculated frequency, $f\_{output}$, for a given UPS 102 is a function of the output power, $P_{o/p}$, of the UPS 102. For example, when the output power of UPS 102 is zero (i.e., $P_{o/p}=P_{0\_Total}$), the frequency is a nominal frequency, $f\_{nominal}$. $f\_{nominal}$ may be, for example, 60 Hz.

Specifically, in the exemplary embodiment, the calculated frequency can be expressed by the following Equation 1:

$$f\_{output}=f\_{nominal}-|\text{slope}\_x|*P_{o/p} \quad \text{Equation 1}$$

where slope_x is determined based on which region of the droop characteristic law UPS 102 is operating in, as described below.

The droop characteristic law defines three operating regions in the exemplary embodiment. A first operating region 302 is defined from $P_{neg\_Total}*0.5$ to $P_{0\_Total}$, where $P_{neg\_Total}*0.5$ is 50% of the negative rated capacity for UPS 102. Notably, the output power is negative in first operating region 302 (i.e., UPS 102 is receiving power, not outputting power). For example, the output power of UPS 102 may become negative if a load, such as first load 124, is disconnected from UPS 102. Accordingly, in first operating region 302, the droop characteristic law facilitates avoiding saturation of frequency control and damping transients from load removal.

A second operating region 304 is defined from $P_{0\_Total}$ to $P_{intermediate\_Total}$, where $P_{intermediate\_Total}$ is an intermediate output power (e.g., 50% of the rated capacity) for UPS 102. A third operating region 306 is defined from $P_{intermediate\_Total}$ to $P_{Full\_Total}$, where $P_{Full\_Total}$ is the 100% of the rated capacity for UPS 102.

As shown in FIG. 3, the droop characteristic law defines a first slope (Slope A) in first operating region 302, a second slope (Slope B) in second operating region 304, and a third slope (Slope C) in third operating region 306. In the exemplary embodiment, slope A is steeper than slope B, which is in turn steeper than slope C. Alternatively, slope A, slope B, and slope C may have any values that enable system 100 to function as described herein. Further, in some embodiments, slopes A, B, and C change dynamically based on transient conditions faced by UPS 102.

The calculated frequency ranges from a maximum frequency, $f\_{max}$, in first operating region 302 to a minimum frequency, $f\_{min}$, in third operating region 306. The maximum and minimum frequencies may be any frequencies that enable system 100 to function as described herein. For example, for a 50 Hz system, the maximum frequency may be approximately 52 Hz and the minimum frequency may be approximately 48.5 Hz. In the exemplary embodiment, the difference between $f\_{nominal}$ and $f\_{min}$ is set by a control algorithm executing, for example, on controller 200. Similarly, the difference between $f\_{nominal}$ and $f\_{max}$ is set by a control algorithm.

Figure 4:
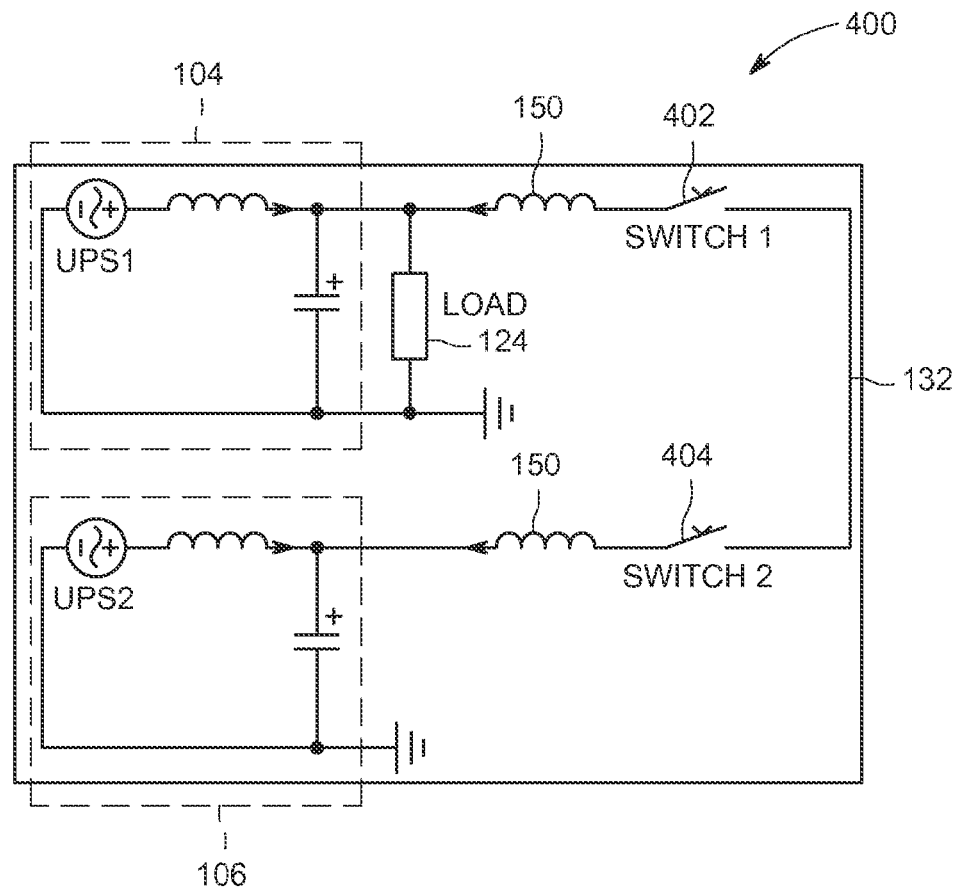
FIG. 4 is a schematic diagram illustrating hot swapping an uninterruptible power supply (UPS) into a power system.
Figure 5A:
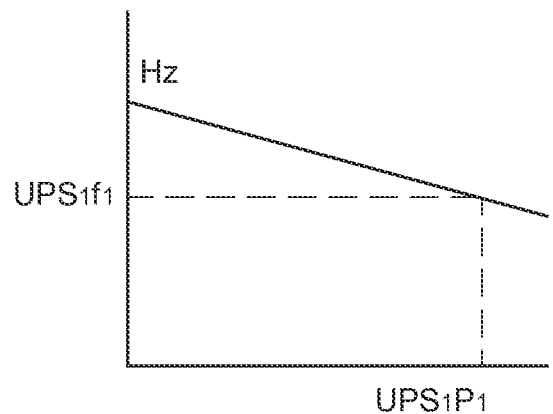
FIGS. 5A-5C are diagrams illustrating operating points at different stages of the hot swapping process shown in FIG. 4.
Figure 5B:
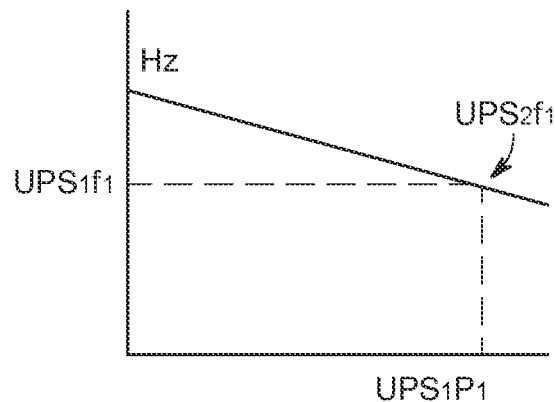
Figure 5C:
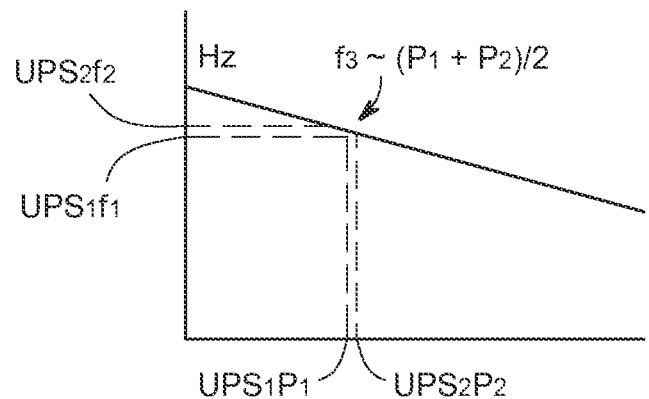

System 100 also facilitates hot swapping one or more UPSs 102 in and/or out of system 100. That is, system 100 facilitates swapping UPSs 102 in and out of system 100 during operation of system 100. FIG. 4 is a schematic diagram of a system 400 that illustrates hot swapping in second UPS 106. That is, system 600 initially includes first UPS 104 but not second UPS 106. Unless otherwise noted, system 400 is substantially similar to system 100 (shown in FIGS. 1 and 2). FIGS. 5A-5C illustrate the operating points of system 400 at different stages of the hot swapping in of second UPS 106.

Initially, as noted above, first UPS 104 is connected to ring bus 132, but second UPS 106 is not. Accordingly, in a first state, a first switch 402 between first UPS 104 and ring bus 132 is closed, and a second switch 404 between second UPS 106 and ring bus 132 is open. Further, first UPS 104 is drooping (i.e., operating according to the droop characteristic law). The operating point of first UPS 104 in the first state is shown in FIG. 5A.

In a second state, to prepare second UPS 106 for connection to ring bus 132, a phase angle, δ, and an output frequency, f, of second UPS 106 are synched with the phase angle and output frequency of ring bus 132. Specifically, as shown in FIG. 5B, as first UPS 104 is the only other UPS 102 in system 400, the output frequency of second UPS 106 is set equal to the output frequency of first UPS 104. In the second state, first switch 402 is still closed, and second switch 404 is still open.

To complete the hot swapping process and place system 400 in a third state, second switch 404 is closed, connecting second UPS 106 to ring bus 132. Once second switch 404 is closed, then after a relatively brief predetermined period of time, set by protection and control characteristics of second UPS 106, the output voltage of second UPS 104 is also droop controlled and is now independent of the voltage phase/frequency at ring bus 132. The operating points of first and second UPSs 104 and 106 are shown in FIG. 5C. Notably, a frequency, $f_3$, is a function of the average of the output powers of the first and second UPSs 104 and 106.

Figure 6A:
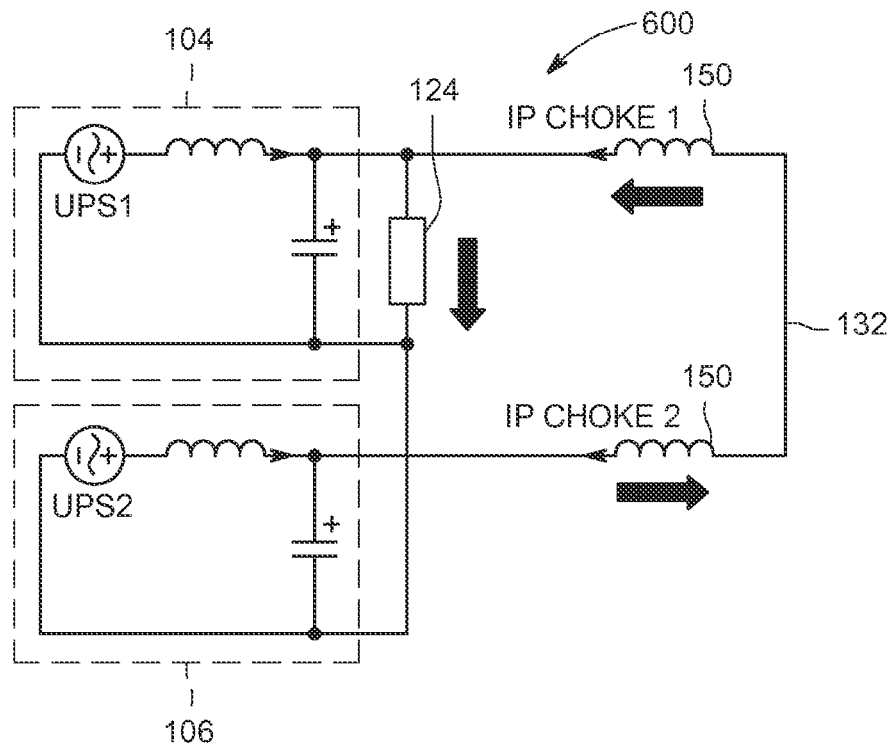
FIGS. 6A and 6B are simplified diagrams illustrating the effects of sudden removal of a load from a power system.
Figure 6B:
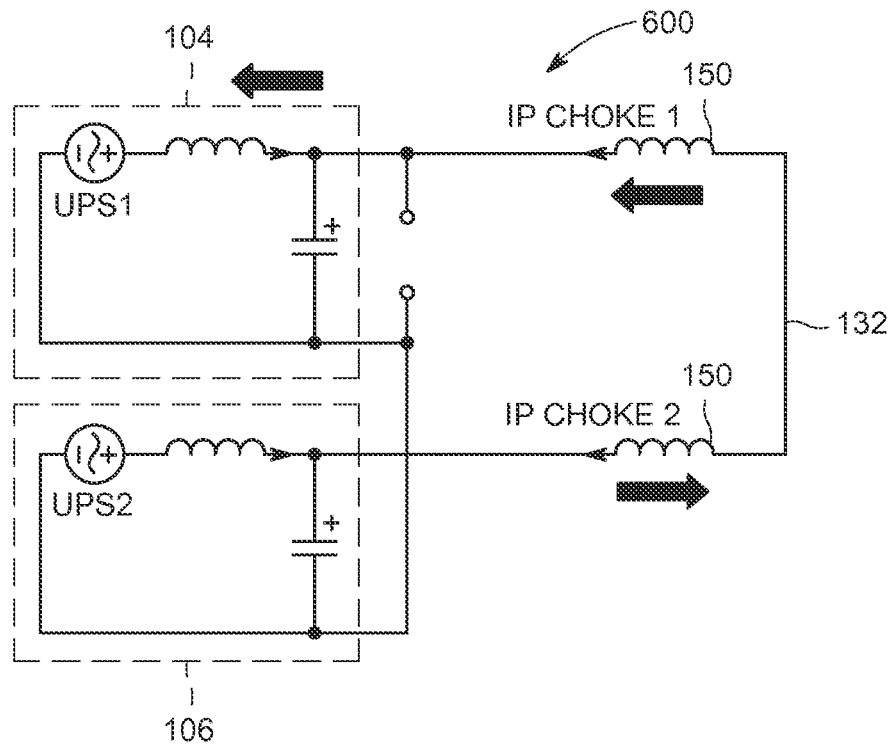

As noted above, when a load, such as first load 124, is disconnected from UPS 102, UPS 102 may have a negative output power (i.e., UPS 102 may receive power). FIGS. 6A and 6B are simplified diagrams illustrating the effects of sudden removal of first load 124 from a system 600 including first UPS 104 and second UPS 106. Unless otherwise noted, system 600 is substantially similar to system 100 (shown in FIGS. 1 and 2).

As shown in FIG. 6A, with first load 124 coupled to first UPS 104, and no load coupled to second UPS 106, power flows from second UPS 106, through choke 150 associated with second UPS 106, along ring bus 132, through choke 150 associated with first UPS 104 and into first load 124. However, as shown in FIG. 6B, when first load 124 removed, for a relatively brief period of time, power flows from second UPS 106, through choke 150 associated with second UPS 106, along ring bus 132, through choke 150 associated with first UPS 104 and into first UPS 104 itself.

Accordingly, first UPS 104 has a negative output power that may impact operation of first UPS 104. For example, the negative output power charges a DC capacitor 208 (shown in FIG. 2) in first UPS 104, and the voltage across capacitor 208 begins increasing. The increasing DC voltage, which depends on the size of first load 124, may damage capacitor 208 and/or semiconductor switches in first UPS 104.

To discharge the energy stored in capacitor 208, several potential solutions are available. For example, in some embodiments, a crowbar device or chopper load may be utilized on capacitor 208, a four quadrant rectifier may be used to discharge capacitor 208, a minimum load may be selectively connected/disconnected from first UPS 104, a parallel inductor choke may be utilized, energy may be transferred to batteries connected to rectifier 206 (shown in FIG. 2) of first UPS 104, and/or first UPS 14 may be synchronized with ring bus 132 to prevent the transfer of power. However, these potential solutions may be relatively impractical, expensive, and/or complex.

Figure 7:
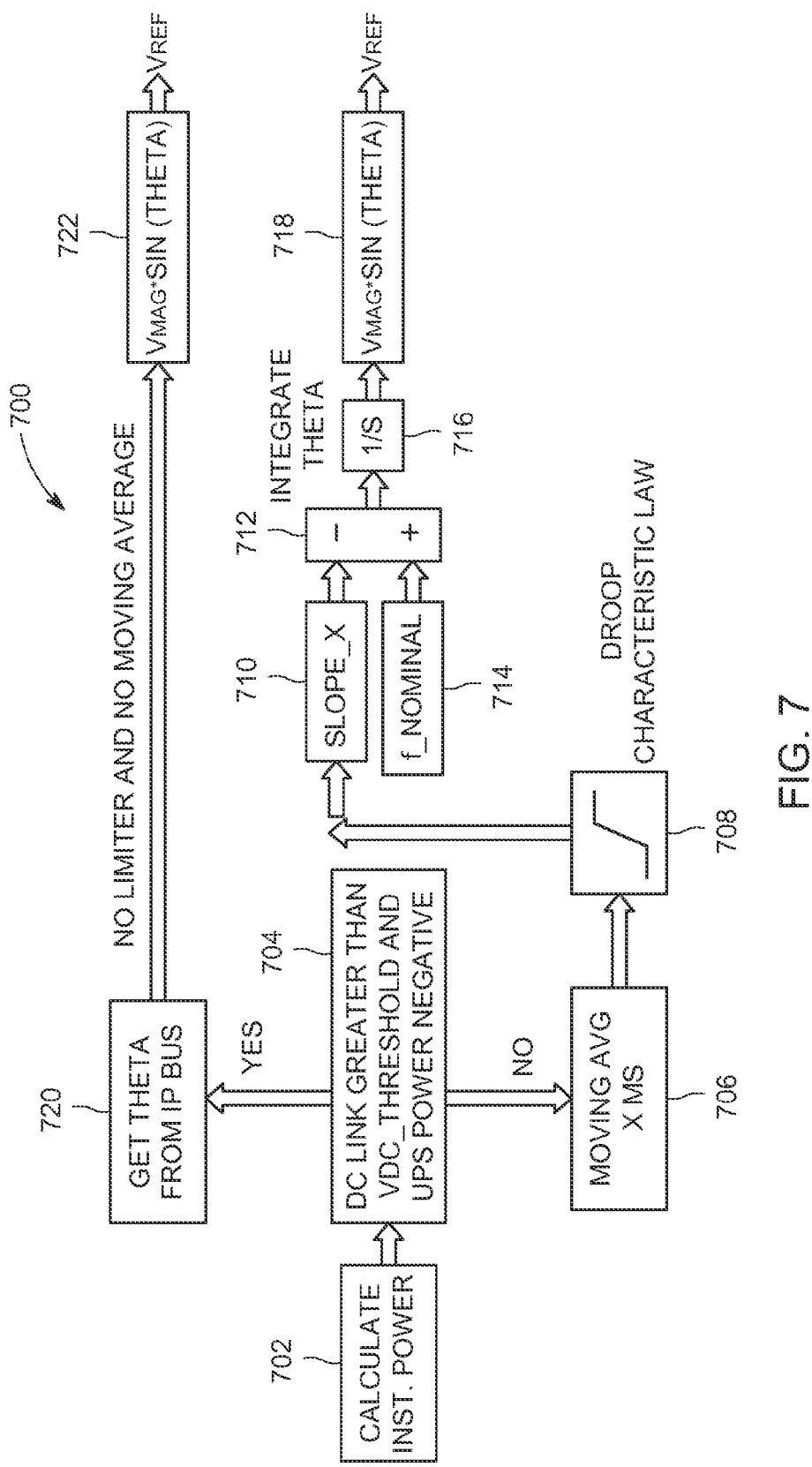
FIG. 7 is a logic diagram illustrating an exemplary control algorithm that may be used with the system shown in FIGS. 1 and 2.

FIG. 7 is a logic diagram illustrating an exemplary control algorithm 700 for handling removal of a load, such as first load 124, from a UPS 102. Control algorithm 700 may be performed, for example, using controller 200. In control algorithm 700, an instantaneous output power of UPS 102 is calculated at block 702. Once the instantaneous output power is calculated, a determination block 704 determines whether a DC link voltage (e.g., a DC voltage across capacitor 208 (shown in FIGS. 6A and 6B)) is greater than a DC voltage threshold (e.g., approximately 815 Volts for a 800 V capacitor) and whether the instantaneous output power of UPS 102 is negative.

If at least one of the conditions is not satisfied (i.e., the DC link voltage is below the DC voltage threshold, or the instantaneous output power of UPS 102 is non-negative, flow proceeds to block 706. At block 706, a moving average of the output power of UPS 102 is taken over the previous x milliseconds (ms). x, may be, for example, in a range from approximately 10 milliseconds (ms) to 20 ms.

The average from block 706 is fed to a droop characteristic law 708, such as the droop characteristic law shown in FIG. 3. Using droop characteristic law 708, a slope 710 is determined, and a calculation block 712 calculates an output frequency from Equation 1 (above) based on slope 710 and a nominal frequency 714. The result of calculation block 712 is integrated at block 716 to obtain a phase angle, theta, which is set as the phase angle of the output voltage of UPS 102 at block 718.

If, however, the DC link voltage is above the DC voltage threshold and the instantaneous output power of UPS 102 is negative (i.e., conditions indicative of transients due to sudden load removal), flow proceeds to block 720. At block 720, the output voltage of UPS 102 is synchronized in phase and frequency with ring bus 132. That is, theta is taken from ring bus 132 and is set as the phase angle of the output voltage of UPS 102 at block 722. UPS 102 may be synchronized with ring bus 132 using, for example, a digital phase-locked loop. Notably, no limiter or moving average is utilized when the DC link voltage is above the DC voltage threshold and the instantaneous output power of UPS 102 is negative.

Using the flow of blocks 720 and 722, the DC link voltage should stop increasing. When the DC link voltage stops increasing, UPS 102 may be disconnected from ring bus 132, for example, by opening a contactor coupled between UPS 102 and ring bus 132. Once the DC link voltage reaches a predefined voltage, UPS 102 may be reconnected to ring bus 132 using, for example, the hot swapping in process described above in reference to FIGS. 4 and 5A-5C.

As compared to at least some known power systems, the systems and methods described herein facilitate synchronizing a plurality of UPSs such that the plurality of UPSs do not interfere with or override one another. A control device calculates an output voltage frequency for each UPS. The control device controls the UPSs such that each UPS operates at its respective calculated output voltage frequency to supply power to at least one load. Further, the systems and methods described herein facilitate maintaining stability of a power system when a load is suddenly removed from a UPS.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) calculating an output voltage frequency for each UPS of a plurality of UPSs; and (b) controlling operation of each UPS based on the respective calculated output voltage frequencies.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a plurality of uninterruptible power supplies (UPSs);
   a ring bus;
   at least one load electrically coupled to said plurality of UPSs and said ring bus; and
   a controller communicatively coupled to said plurality of UPSs, said controller configured to:
   determine whether said at least one load has been disconnected from one UPS of said plurality of UPSs based on whether an output voltage of said one UPS is negative and whether a DC link voltage of said one UPS is above a predetermined voltage threshold;
calculate an output voltage frequency for each UPS of said plurality of UPSs; and
control operation of said each UPS based on the respective calculated output voltage frequencies.

2. A system in accordance with claim 1, wherein said controller is configured to calculate the output voltage frequency for a UPS based on an output power of the UPS.

3. A system in accordance with claim 1, wherein said controller is configured to calculate the output voltage frequency for a UPS as the sum of a predetermined frequency and the product of a slope and an output power of the UPS.

4. A system in accordance with claim 3, wherein said controller is further configured to determine the slope from a droop characteristic law that includes a plurality of different operating regions each having an associated slope.

5. A system in accordance with claim 1, wherein said controller is configured to calculate the output voltage frequency when hot swapping an additional UPS into said system.

6. A system in accordance with claim 1, wherein said controller is further configured to:
detect that said at least one load has been disconnected from said one UPS based on the determination; and
synchronize, in response to the detection, the output voltage frequency and an output voltage phase angle of said one UPS with a voltage frequency and voltage phase angle of said ring bus.

7. A controller for controlling a power supply system that includes a plurality of uninterruptible power supplies (UPSs), a ring bus, and at least one load electrically coupled to the plurality of UPSs and the ring bus, said controller comprising:
a processor; and
a memory device communicatively coupled to said processor, said memory device storing executable instructions configured to cause said processor to:
determine whether the at least one load has been disconnected from one UPS of the plurality of UPSs based on whether an output voltage of the one UPS is negative and whether a DC link voltage of the one UPS is above a predetermined voltage threshold;
calculate an output voltage frequency for each UPS of the plurality of UPSs; and
control operation of each UPS based on the respective calculated output voltage frequencies.

8. A controller in accordance with claim 7, wherein to calculate an output voltage frequency for each UPS, said executable instructions are configured to cause said processor to calculate the output voltage frequency for a UPS based on an output power of the UPS.

9. A controller in accordance with claim 7, wherein to calculate an output voltage frequency for each UPS, said executable instructions are configured to cause said processor to calculate the output voltage frequency for a UPS as the sum of a predetermined frequency and the product of a slope and an output power of the UPS.

10. A controller in accordance with claim 9, wherein said executable instructions are further configured to cause said processor to determine the slope from a droop characteristic law that includes a plurality of different operating regions each having an associated slope.

11. A controller in accordance with claim 7, wherein to calculate an output voltage frequency for each UPS, said executable instructions are configured to cause said processor to calculate the output voltage frequency when hot swapping an additional UPS into the power supply system.

12. A controller in accordance with claim 7, wherein said executable instructions are further configured to cause said processor to:
detect that the at least one load has been disconnected from the one UPS based on the determination; and
synchronize, in response to the detection, the output voltage frequency and an output voltage phase angle of the one UPS with a voltage frequency and voltage phase angle of the ring bus.

13. A method of controlling a power supply system that includes a plurality of uninterruptible power supplies (UPSs), a ring bus, and at least one load electrically coupled to the plurality of UPSs and the ring bus, the method comprising:
determining, by a controller communicatively coupled to the plurality of UPSs, whether the at least one load has been disconnected from one UPS of the plurality of UPSs based on whether an output voltage of the one UPS is negative and whether a DC link voltage of the one UPS is above a predetermined voltage threshold;
calculating, using the controller, an output voltage frequency for each UPS of the plurality of UPSs; and
controlling operation of each UPS based on the respective calculated output voltage frequencies.

14. A method in accordance with claim 13, wherein calculating an output voltage frequency comprises calculating the output voltage frequency for a UPS based on an output power of the UPS.

15. A method in accordance with claim 13, wherein calculating an output voltage frequency comprises calculating the output voltage frequency for a UPS as the sum of a predetermined frequency and the product of a slope and an output power of the UPS.

16. A method in accordance with claim 15, further comprising determining the slope from a droop characteristic law that includes a plurality of different operating regions each having an associated slope.

17. A method in accordance with claim 13, wherein calculating an output voltage frequency comprises calculating the output voltage frequency when hot swapping an additional UPS into the power supply system.

18. A method in accordance with claim 13, further comprising:
detecting that the at least one load has been disconnected from the one UPS based on the determination; and
synchronizing, in response to the detection, the output voltage frequency and an output voltage phase angle of the one UPS with a voltage frequency and voltage phase angle of the ring bus.

* * * * *